June 15, 1937.  E. D. FRANK  2,084,022
TAPPING MACHINE
Filed Feb. 10, 1936
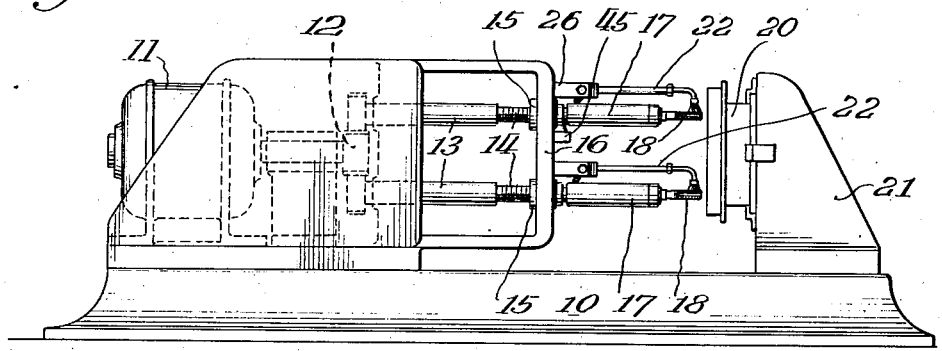
Fig. 1.
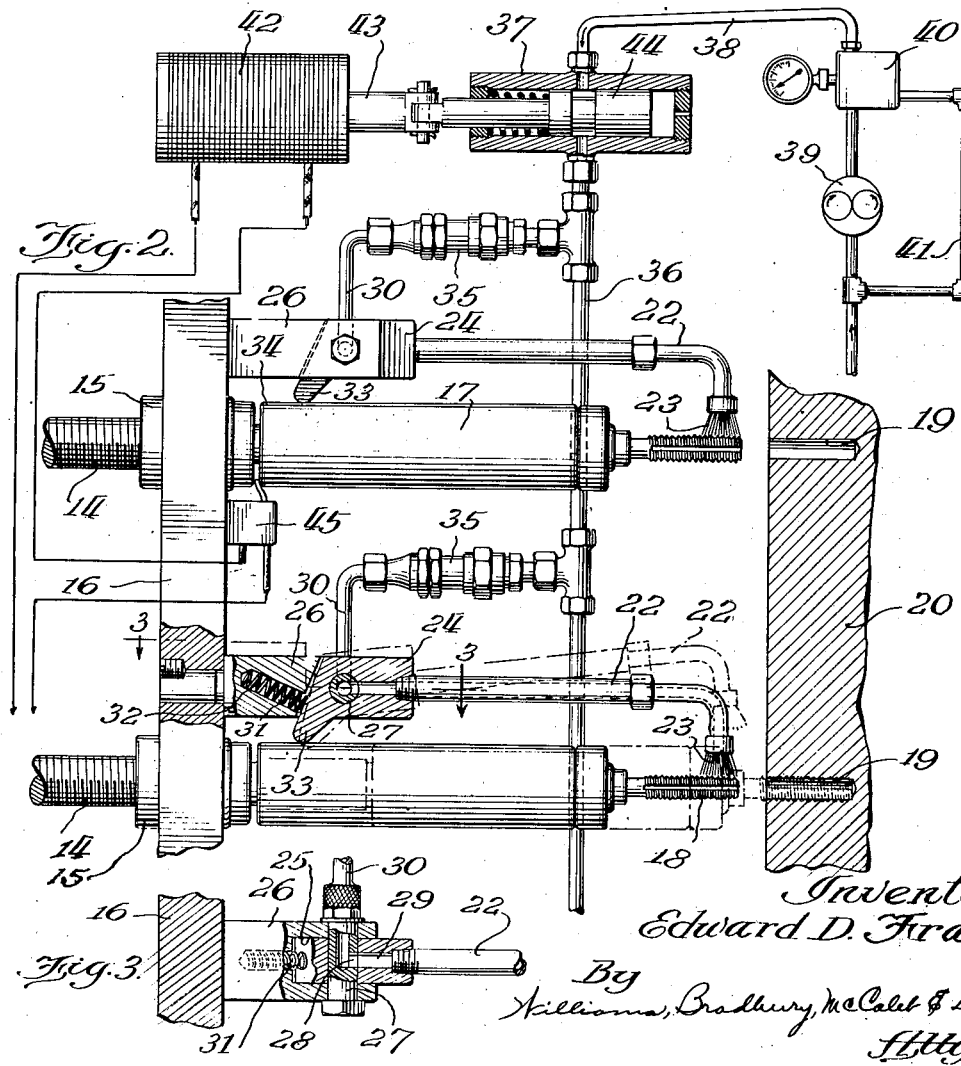
Fig. 2.
Fig. 3.
Inventor.
Edward D. Frank
By
Williams, Bradbury, McCaleb & Hinkle
Attys.

Patented June 15, 1937

2,084,022

UNITED STATES PATENT OFFICE 2,084,022

TAPPING MACHINE

Edward D. Frank, Cincinnati, Ohio, assignor to The National Automatic Tool Company, Richmond, Ind., a corporation of Indiana Application February 10, 1936, Serial No. 63,080

13 Claims. (Cl. 10—106)

This invention relates to tapping machines, and particularly appertains to automatic means for cleaning the taps and preferably also to means for applying lubricant thereto.

In the case of some operations, for example in machining cast iron, it is highly undesirable to allow lubricant to become distributed over the surface of the work since it impairs the efficiency of other machining operations. It is, therefore, highly desirable to limit the application of lubricant directly to the taps themselves.

In carrying out the invention I provide a device which is automatically moved into and out of contact with a tap so as to clean the tap and preferably apply lubricant directly to it. It is preferred to actuate this device directly by the tap spindle so that the movements of the device may be timed exactly to correspond with the position of the tap. In order that the tap may feed into the work, the cleaning and lubricating device preferably has a stationary position with relation to the work so that it remains out of contact with the work while the tap is working into its opening and retracting therefrom.

The invention will be readily and fully understood from the following description of a preferred embodiment thereof, taken in conjunction with the accompanying drawing, in which Figure 1 is a side elevation of a tapping machine embodying my invention.

Fig. 2 is a diagrammatic view showing a pair of taps on a larger scale, this view being shown partly in section in order to illustrate more fully the construction of the device, and Fig. 3 is a sectional plan detail view taken on the line 3—3 of Fig. 2.

Referring to the drawing, the reference numeral 10 indicates the base of a tapping machine, on which is mounted a reversible motor 11. The motor 11 drives, through suitable gearing 12, a plurality of sleeves 13. The sleeves 13 have lead screws 14 splined therein so that these screws are caused to rotate with the spindles 13, although they may move telescopically therein. The screws 14 pass through lead nuts 15 carried by a lead screw plate 16. The outer ends of the lead screws 14 constitute tap spindles 17 in which are mounted the taps 18. These taps are intended to tap openings 19 in a piece of work 20 shown carried by a suitable fixture 21 on the base 10.

It will be understood that in the operation of the machine the motor 11 is driven in one direction with the result that the lead screws 14 rotate in the appropriate direction, and the taps are moved into the openings 19 at the proper rate. When the openings 19 have been tapped, the motor 11 is reversed, with the result that the taps 18 are retracted and withdrawn from the work into the position shown in Figs. 1 and 2. The cycle of the tapping machine may be controlled by hand or automatically in known manner.

The cleaning and lubricant-supplying device 22 is preferably in the form of a tube, the outer end of which is turned downwardly and provided with a suitable brush 23 which is intended to remove the chips from the taps. The tube 22 is mounted in a block 24 which is located in a slot 25 in a block 26. The block 26 is rigidly mounted on the lead screw plate 16 close to the feed screw of the tap with which the device is to operate. The block 24 is pivotally mounted on the block 26 by means of a hollow pivot 27. The pivot 27 is provided with an opening 28 which is in communication with an opening 29 in the block 24, this opening communicating with the pipe 22. The pivot 27 is connected to a conduit 30 whereby lubricant may be supplied to the brush 23.

The block 26 is provided with an interior bore 31 which contains a spring 32. This spring normally presses against the block 25 so as to tend to elevate the tube 22 into the position shown in dash and dotted lines in Fig. 2. The block 24 is provided with a downwardly projecting nose 33 which is adapted to cooperate with the spindle 17. The spindle 17 is substantially larger than the lead screw 14 which carries it. When the tap is fed into the work, the nose 33 runs off the end of the spindle 17 and the brush is elevated by the spring 32. This movement removes the brush 23 out of the path of the spindle 17. When the tap reverses the rear shoulder 34 of the tap spindle 17 it comes into contact with the nose 33, with the result that the brush 23 is moved to its downward position. This preferably occurs at a time to bring the brush 23 into contact with the rear threads of the tap. The brush 23 is held in this position by the continued engagement of the spindle 17 with the nose 33 until the tap is fully retracted, at which time the brush 23 is in contact with the forward threads of the tap.

The means for supplying lubricant to the pipes 30 and thereby to the brushes 23 may be of any desired kind. By way of example I have shown a multiple device for supplying lubricant to all the taps of a machine. The pipes 30 are connected by suitable metering valves 35, which may be of any known or suitable type, to a common supply pipe 36. These metering valves insure the supply of a small predetermined amount of lubricant to each of the brushes 23 every time that pressure is applied to the supply pipe 36. These valves may suitably be of the Farval type. The supply pipe is connected through an automatic valve 37 to a pipe 38. Lubricant under pressure is supplied continuously to the pipe 38 by means of a suitable gear pump 39. The pipe 38 is provided with a relief valve 40 and a by-pass 41 so that the lubricant delivered by the pump 39 may be by-passed when the valve 37 is closed and the building up of excess pressures may thus be avoided.

In the normal operation of the machine the valve 37 is opened periodically so as to supply a small definite amount of lubricant to each brush 23. The actuation of the valve 37 may be performed by hand or automatically in any suitable way. It is preferred, however, to effect the actuation of the valve 37 electrically, for example by means of a solenoid 42. The armature 43 of the solenoid 42 is connected to a plunger 44. When the solenoid 42 is energized, the plunger is moved to the left as viewed in Fig. 2, and communication is established between the pipes 38 and 36. The solenoid 42 is preferably energized by one of the spindles 17 closing a switch 45 when it arrives at its fully retracted position. As indicated above, the brush 23 is at that time located in contact with the forward threads of the tap 18. Consequently the lubricant is supplied to the brush 23 at the most advantageous time and as the tap feeds forward again this lubricant is applied over the whole cutting surfaces of the tap. At the same time any chips carried by the tap are removed.

Although the invention has been disclosed in connection with the specific details of a preferred embodiment thereof, it must be understood that such details are not intended to be limitative of the invention except in so far as set forth in the accompanying claims.

Having thus described my invention, what I claim as new and desire to secure by Letters Patent of the United States is:

1. In a tapping machine, a tap adapted to be fed forwardly into the work, a cleaning element adapted to engage the tap, means for holding said cleaning element in contact with the tap during a substantial axial movement thereof, and means actuated by the forward movement of the tap to a predetermined position for moving said cleaning element laterally away from said tap.

2. In a tapping machine, a tap adapted to be fed forwardly into the work, a cleaning element adapted to engage the tap, means for holding said cleaning element in contact with the tap during a substantial axial movement thereof, means maintaining said cleaning element against translation toward the work, and means operated by the forward movement of the tap to a predetermined position for moving the cleaning element laterally away from said tap.

3. In a tapping machine, a tap adapted to be fed forwardly into the work, a cleaning element pivotally mounted to move into and out of engagement with the tap, means normally tending to swing said cleaning element away from the tap, means adapted to be engaged by the tap spindle during a substantial axial movement thereof, for maintaining said cleaning element in engagement with the tap during said movement, and means for maintaining the cleaning element against translation towards the work.

4. In a tapping machine, a tap adapted to be fed forwardly into the work, a brush adapted to engage the tap during a substantial axial movement thereof, means for supplying lubricant to said brush, and means controlled by the forward movement of the tap to a predetermined position for moving said brush laterally away from said tap.

5. In a tapping machine, a tap adapted to be fed forwardly into the work, a brush adapted to engage the tap during a substantial axial movement thereof, means for maintaining said brush against translation towards the work, means for supplying lubricant to said brush, and means actuated by the forward movement of the tap to a predetermined position for moving the brush laterally from said tap.

6. In a tapping machine, a tap adapted to be fed forwardly into the work, a brush pivotally mounted to move into and out of engagement with the tap, means normally tending to swing said brush away from the tap, means adapted to be engaged by the tap spindle in retracted condition for maintaining said brush in engagement with the tap in its retracted condition, means for supplying lubricant to the brush, and means for maintaining the brush against translation towards the work.

7. In a tapping machine, a tap adapted to be fed forwardly into the work, a brush adapted to engage the tap in its retracted condition, means operated by the retraction of the tap for supplying a charge of lubricant to said brush, and means actuated by the forward movement of the tap for moving said brush laterally away from said tap.

8. In a tapping machine, a tap adapted to be fed forwardly into the work, a brush adapted to engage the tap in its retracted condition, means for holding said brush against translation towards the work, pressure means for supplying lubricant to said brush, a valve for controlling the supply of lubricant therefrom, means operated by the retraction of the tap for opening said valve, and means operated by the forward movement of the tap for moving the brush laterally from said tap.

9. In a tapping machine, a tap adapted to be fed forwardly into the work, a brush pivotally mounted to move into and out of engagement with the tap, means normally tending to swing said brush away from the tap, means adapted to be engaged by the tap spindle in retracted condition to swing said brush into contact with the tap, a conduit for supplying lubricant to the brush, a metering valve in said conduit, electrical means operable on the retraction of the tap for controlling the actuation of the metering valve, and means for maintaining the brush against translation towards the work.

10. In a tapping machine, a tap adapted to be fed forwardly into the work, a brush pivotally mounted to move into and out of engagement with the tap, means normally tending to swing said brush away from the tap, means adapted to be engaged by the tap spindle during a substantial axial movement thereof, for maintaining said brush in engagement with the tap, means for supplying lubricant to the brush, and means for maintaining the brush against translation towards the work.

11. In a tapping machine, a tap adapted to be fed forwardly into the work, a brush adapted to engage the tap during a substantial axial movement thereof, means operated by the retraction of the tap for supplying a charge of lubricant to said brush, and means controlled by the forward movement of the tap to a predetermined position for moving said brush laterally away from said tap.

12. In a tapping machine, a tap adapted to be fed forwardly into the work, a brush adapted to engage the tap during a substantial axial movement thereof, means for holding said brush against translation towards the work, pressure means for supplying lubricant to said brush, a valve for controlling the supply of lubricant therefrom, means operated by the retraction of the tap for opening said valve, and means operated by the forward movement of the tap to a predetermined position for moving the brush laterally from said tap.

13. In a tapping machine, a tap adapted to be fed forwardly into the work, a brush pivotally mounted to move into and out of engagement with the tap, means normally tending to swing said brush away from the tap, means adapted to be engaged by the tap spindle during a substantial axial movement thereof, to swing said brush into contact with the tap, a conduit for supplying lubricant to the brush, a metering valve in said conduit, electrical means operable on the retraction of the tap for controlling the actuation of the metering valve, and means for maintaining the brush against translation towards the work.

EDWARD D. FRANK.